United States Patent [19]
Tabbane et al.

[11] Patent Number: 5,701,586
[45] Date of Patent: Dec. 23, 1997

[54] CELL SELECTION AND RESELECTION BY MOBILE STATION IN A MULTILAYER CELLULAR MOBILE RADIO NETWORK

[75] Inventors: Sami Tabbane, Paris; Christophe Moreau, Chatillon, both of France

[73] Assignee: France Telecom, Paris, France

[21] Appl. No.: 501,490

[22] Filed: Jul. 12, 1995

[30] Foreign Application Priority Data

Jul. 13, 1994 [FR] France ................... 94 08834

[51] Int. Cl.$^6$ .................... H04Q 7/00; H04Q 9/00
[52] U.S. Cl. .................... 455/33.4; 455/33.1; 455/33.2; 455/54.1; 455/56.1; 379/59
[58] Field of Search ................... 455/33.1, 33.2, 455/33.4, 54.1, 56.1, 34.1, 54.2, 62, 63; 379/59, 60

[56] References Cited

U.S. PATENT DOCUMENTS

| | | | |
|---|---|---|---|
| 5,513,379 | 4/1996 | Benveniste et al. | 455/33.4 |
| 5,513,380 | 4/1996 | Ivanov et al. | 455/54.1 |
| 5,530,910 | 6/1996 | Taketsugu | 455/33.4 |
| 5,548,806 | 8/1996 | Yamagichi et al. | 455/33.1 |

FOREIGN PATENT DOCUMENTS 526436   2/1993   European Pat. Off.

*Primary Examiner*—Chi H. Pham
*Assistant Examiner*—Gertrude Arthur
*Attorney, Agent, or Firm*—Lowe, Price, LeBlanc & Becker

[57] ABSTRACT

Cell selection and reselection by mobile station in a cellular mobile radio network with a plurality of layers of cells includes, when the station is in a standby state and after selection of a cell by the station, identification of a layer containing the selected cell, reselection of cells in the layer during a predetermined time-delay, cumulative counting of the number of cells reselected in the layer during that time-delay, and comparison of the cumulative number with two thresholds. The reselection, cumulative counting and comparison steps are repeated if the cumulative number is between the thresholds. Otherwise, a change of layer is effected on the basis of the comparison and the previous steps are repeated, starting from the identification step. The mobile station selects the layer most appropriate to the speed at which it is travelling.

15 Claims, 4 Drawing Sheets

CELL SELECTION AND RESELECTION BY MOBILE STATION IN A MULTILAYER CELLULAR MOBILE RADIO NETWORK

BACKGROUND OF THE INVENTION

1. Field of the Invention

The present invention concerns a method of access cell selection and reselection by a mobile station in the standby state in a multilayer cellular mobile radio network.

2. Description of the Prior Art

In a prior art cellular network, whether of the single-layer or multilayer type, a mobile station in the standby state continuously selects and reselects the access cell through the intermediary of which the mobile station receives or sets up a call.

In the case of a multilayer cellular radio network comprising a plurality of layers (subnetworks) of cells, the sizes of the cells of the respective layers are different. Accordingly, a small cell layer is provided for low-speed or stationary mobile stations and a large cell layer is provided for higher speed mobile stations.

If a given mobile station can access only one predetermined layer, the cell size of that layer is not always appropriate to the speed at which the mobile station is moving. This leads to an overloading of large cells caused by mobile stations temporarily travelling at low speed, and cutting off of calls involving mobile stations temporarily travelling at high speed connected to small cells.

It is therefore preferable for the mobile station to be able to access more than one layer of the network; the mobile station user then chooses which layer to use. If the choice is left to the user it will not necessarily be the most appropriate one, and users tend always to select the same key.

According to EP-A-0 526 436, the mobile station can change layer during a call by intercell handover. The change of layer mid-call is based on an estimate of the speed at which the mobile station is travelling, which takes several seconds and can lead to cutting off of the call. Further, although intercell handovers in the same cell layer are necessary when the mobile station is moving, intercell handovers between cells of different layers increase operating costs.

OBJECT OF THE INVENTION

The main object of this invention is to remedy the aforementioned drawbacks by providing a method of access cell selection and reselection by a mobile station in the standby state in a multilayer cellular mobile radio network that enables a mobile station to select a cell of the most appropriate size for the speed at which the mobile station is moving and consequently with no risk of a call being cut off.

SUMMARY OF THE INVENTION

Accordingly, a method of cell selection and reselection by a mobile station in a multilayer cellular mobile radio network in which each layer includes a plurality of cells and the cells comprise base stations respectively, in which method, when the mobile station is in a standby state and after selection of a cell as a selected cell by the mobile station, the following steps:

identifying a layer containing the selected cell in an identified layer, reselecting cells included in the identified layer during a predetermined time-delay associated with the selected cell in reselected cells, cumulatively counting a number of reselected cells which are reselected in the identified layer during the predetermined time-delay, comparing the number of reselected cells with a first predetermined threshold associated with the selected cell and a second predetermined threshold associated with the selected cell and lower than the first predetermined threshold, repeating the reselecting, cumulative counting and comparing steps if the number of reselected cells lies between the first predetermined threshold and second predetermined threshold, changing the identified layer to a first selected layer of the multilayer cellular mobile radio network having cells covering the cells of the identified layer if the number of reselected cells is above the first predetermined threshold and to a second selected layer of the multilayer cellular mobile radio network having cells covered by the cells of the identified layer if the number of reselected cells is below the second predetermined threshold, and selecting a cell included in one of the first selected layer and second selected layer as another selected cell thereby repeating the previous steps from the layer identifying step.

The mobile station selects the layer in which the cells have the most appropriate size to the speed of the mobile station.

The identification step includes detecting an identifier of the layer containing the selected cell, the identifier being sent periodically by one of the base stations of the multilayer cellular mobile radio network transmitting to the selected cell.

In response to the identifier, the mobile station detects the predetermined time-delay that is sent by one of the base stations of the multilayer cellular mobile radio network transmitting to the selected cell.

In response to the identifier, the mobile station detects the first predetermined threshold and second predetermined threshold that are sent by one of the base stations of the multilayer cellular mobile radio network transmitting to the selected cell.

The predetermined thresholds and time-delays can differ from one cell to another in the same layer and can be modified in the base station.

The layer identifying step follows any breaking off of communication between the mobile station and the multilayer cellular mobile radio network.

Setting up a call between the mobile station and the multilayer cellular mobile radio network interrupts a current step between the layer identifying step and the cell selecting step.

BRIEF DESCRIPTION OF THE DRAWINGS

The foregoing and other objects, features and advantages of the invention will be apparent from the following detailed description of several embodiments of the invention witch reference to the corresponding accompanying drawings in which.

DESCRIPTION OF THE PREFERRED EMBODIMENT

Figure 1:
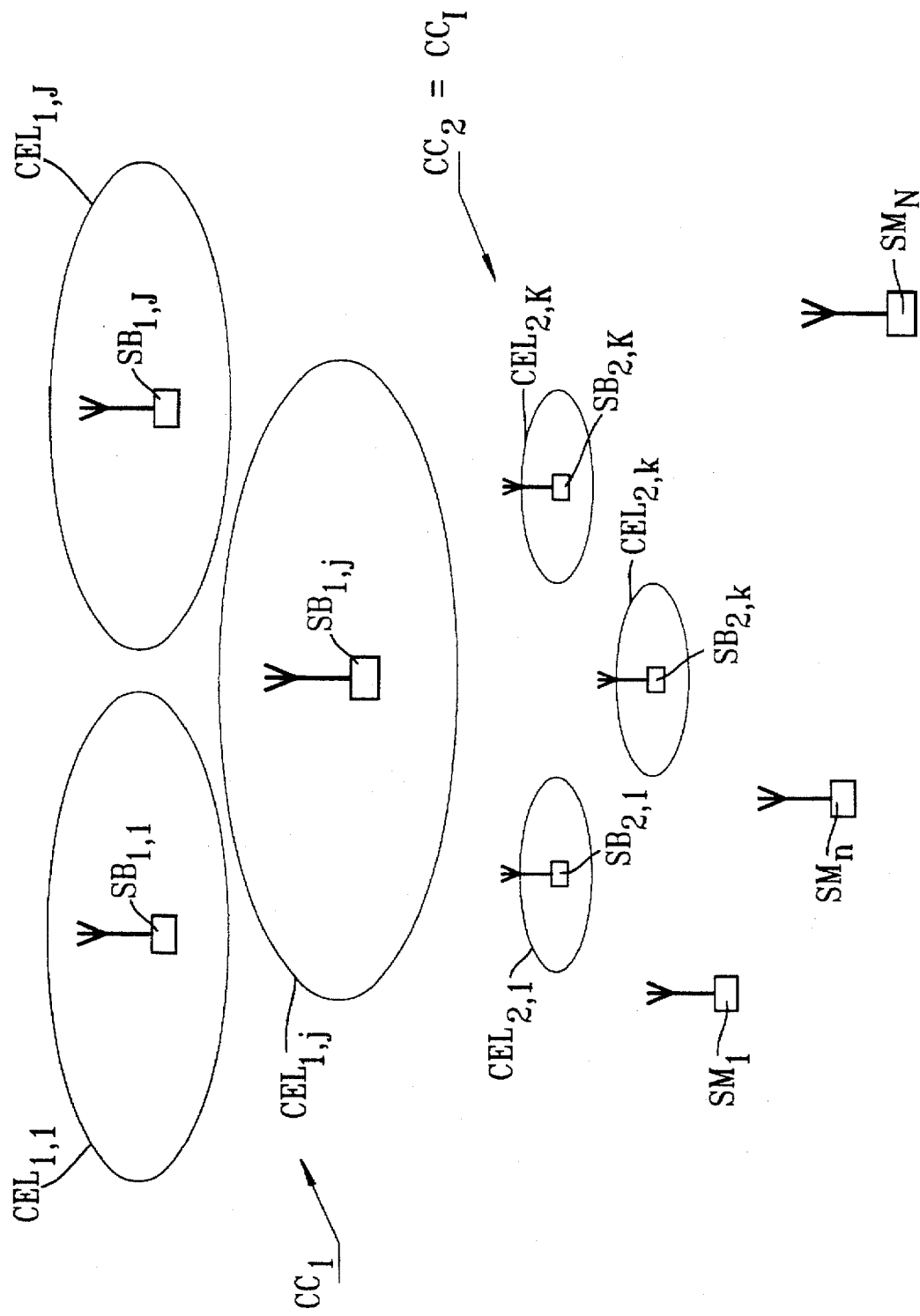
FIG. 1 shows a prior art multilayer cellular mobile radio network.

Referring to FIG. 1, a cellular mobile radio network comprises I layers (also called subnetworks) of cells $CC_1$ through $CC_I$, where I is a positive integer between 2 and 4, for example. When I=4, the network comprises a layer of hypercells for communication with ships and aircraft via satellites, a layer of large macrocells for fast vehicles such as high-speed trains, a layer of small macrocells (covering a few tens of $km^2$) for automobile vehicles and pedestrians, and a layer of microcells (covering a few hundred $m^2$) essentially for pedestrians.

To avoid overcomplicating FIG. 1, in that figure I=2.

The first layer $CC_1$ comprises first cells or macrocells $CEL_{1,1}$ through $CEL_{1,J}$ each having an area of about 10 $km^2$ to about 40 $km^2$. The first cells $CEL_{1,1}$ through $CEL_{1,J}$ are the cells of the pan-European cellular mobile radio system known as GSM ("Global System for Mobile Communication"), for example. The cells are often combined in groups of adjacent cells called location areas. Each cell $CEL_{1,j}$, where j is an integer between 1 and the integer J is associated with a fixed base station $SB_{1,j}$ which controls the radio channels. These include one or more signalling channels for exchange of digital data between the base station and mobile stations $SM_1$ through $SM_N$ where N is a positive integer and for interface protocols for setting up calls between the telephone network and the mobile station.

The layer of macrocells $CC_1$ further comprises an infrastructure (not shown) including computers, switches and digital data and telephone signal transport means to implement functions including switching, location of mobile stations in the network, and operation and maintenance.

The second layer of cells $CC_2$ of the cellular network comprises second cells $CEL_{2,1}$ through $CEL_{2,K}$, also known as microcells, where K is a positive integer. Each has an area of between about a few hundred $m^2$ and about a few $km^2$. The second layer of cells forms a second subnetwork, for example the Digital European Cordless Telecommunications (DECT) network. Each second cell $CEL_{2,k}$, where k is an integer between 1 and K, contains a fixed base station $SB_{2,k}$ the functions of which are similar to those of the base station of a macrocell $CEL_{1,j}$.

The layer $CC_2$, referred to as the microcell subnetwork, comprises an infrastructure of computers, switches and digital data transport means similar to that of the macrocell network.

The layers of cells $CC_1$ and $CC_2$ are superposed and serve the same geographical area.

The macrocell $CEL_{1,j}$ is therefore an umbrella cell having extended radio coverage encompassing a plurality of microcells. The macrocells are more particularly intended for high-speed mobile stations, while the microcells are the preferred means of providing service to low-speed or stationary mobile stations.

A mobile station $SM_n$, where n is an integer between 1 and N, includes a radio transceiver for setting up and receiving outgoing and incoming calls via one of the base stations $SB_{1,1}$ through $SB_{1,J}$ or $SB_{2,1}$ through $SB_{2,K}$. When it is switched on, the mobile station $SM_n$ selects one of the base stations, exchanges digital data with the selected base station and selects a channel associated with the selected base station.

In more detail, the base station $SB_{1,j}$ or $SB_{2,k}$ broadcasts on an associated signalling channel signalling data relating to the location area and to the cell $CEL_{1,j}$ or $CEL_{2,k}$ covered by the station $SB_{1,j}$ or $SB_{2,k}$. In the case of the GSM network, this signalling channel is the Broadcast Control CHannel (BCCH) which is time-division multiplexed into 235 ms multiframes with three control channels, namely the Frequency Correction CHannel (FCCH), the Synchronization CHannel (SCH) and the Common Control CHannel (CCCH). The BCCH broadcasts four "System Information" messages including network parameters such as the maximal power allowed in the cell, the cell access threshold and the identity of the location area.

Figure 2:
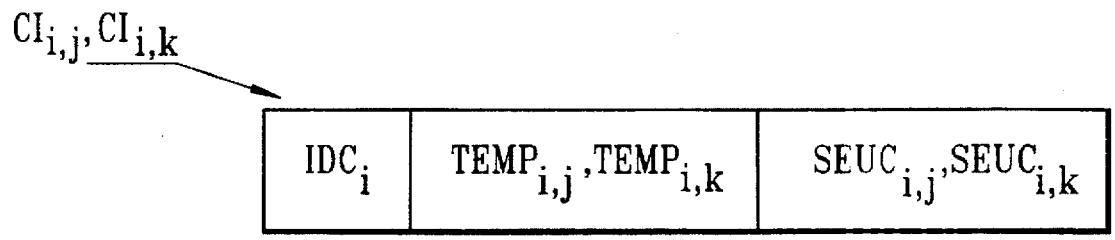
FIG. 2 shows a data field sent by the base stations of the network of the invention.

Each of the four "System Information" messages is broadcast every 4×235=940 ms. One of these four messages contains a data field $CI_{i,j}$ or $CI_{i,k}$ specific to the invention and shown in FIG. 2, where i is 1 or 2 corresponding to layer $CC_1$ or $CC_2$. The field $CI_{i,j}$ or $CI_{i,k}$ is 10 bits long and contains a layer identifier $IDC_i$ coded on two bits, a time-delay $TEMP_{i,j}$ or $TEMP_{i,k}$ coded on five bits and a layer threshold $SEUC_{i,j}$ or $SEUC_{i,k}$ coded on three bits. As explained below, in the case of a network with at least three layers, the data field contains two thresholds and the data field is longer than 10 bits. The layer identifier $IDC_i$ identifies up to four different layers. The time-delay $TEMP_{i,j}$ or $TEMP_{i,k}$ has a maximum value of $2^5=32$ seconds (in the case where the step is 1 s). The layer threshold $SEUC_{i,j}$ or $SEUC_{i,k}$ has a maximum value $2^3=8$ or more generally varies in proportions of 1 to 8. Thus each base station periodically transmits information required for layer selection. The layer identifier is specific to each layer; the time-delay and the layer threshold are fixed for each cell and can differ from one cell to another in the same layer. The purpose of the information contained in the field $CI_{i,j}$ or $CI_{i,k}$ is explained below.

Figure 3:
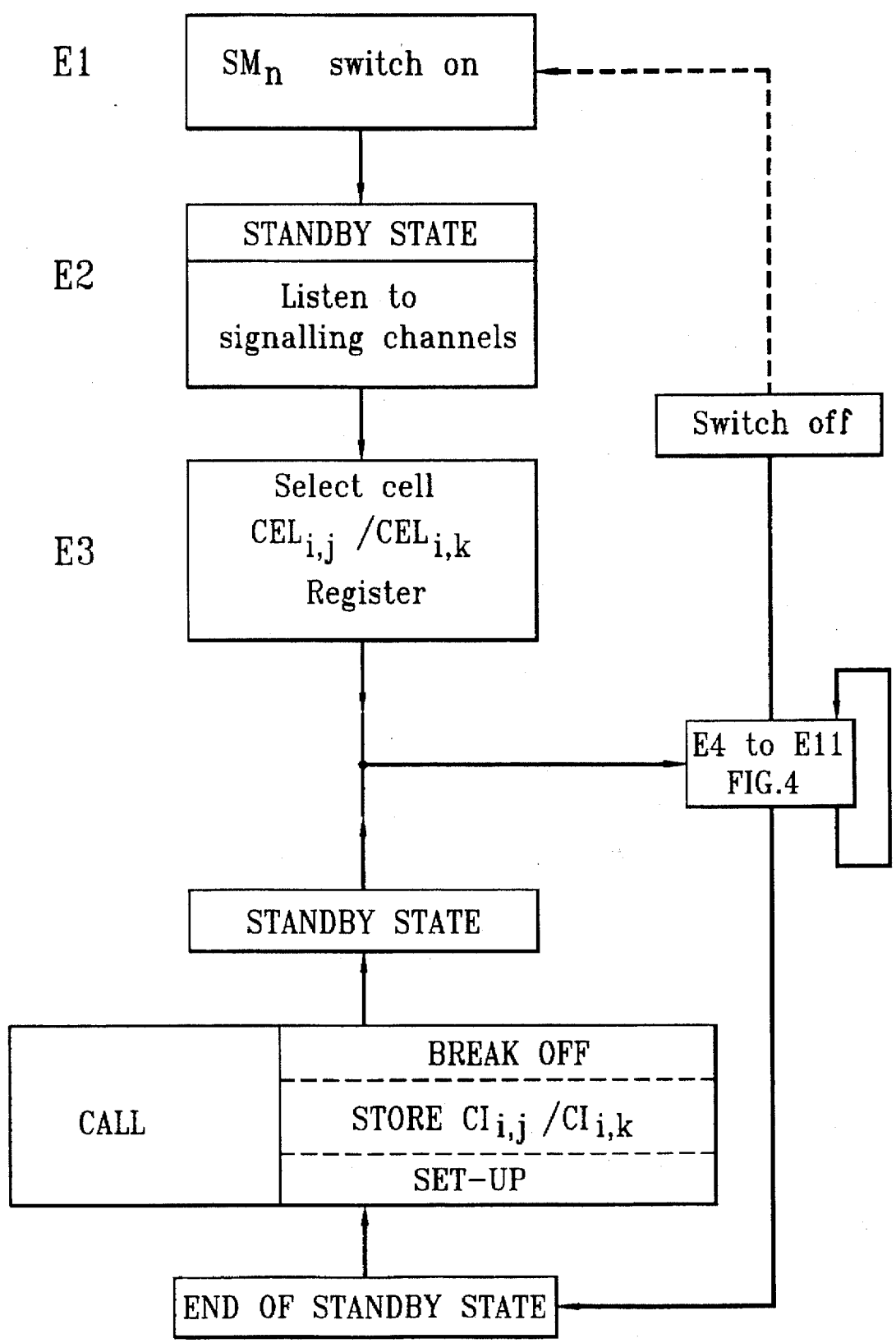
FIG. 3 shows an algorithm for selecting and registering a mobile station in a prior art cellular network.

Referring to FIG. 3, access cell selection and registration of any mobile station $SM_n$ are performed in three steps E1 through E3 shown in diagrammatic form. The mobile station $SM_n$ is switched on by a user in step E1 and goes to the standby state. In step E2 the mobile station $SM_n$ listens to the signalling channels associated with the two layers.

In a first embodiment of the invention, the mobile station scans all of the frequency band used by the two layers to look for the signalling channels.

In a second embodiment of the invention the frequencies of the signalling channels of the two subnetworks are stored in the mobile station and the latter is tuned directly to the signalling channels on a cyclic basis.

In step E3 the mobile station $SM_n$ selects a signalling channel and thus one cell of the network. To do this the mobile station calculates an average received signal level from at least five samples per channel distributed over a period of 3 to 5 seconds, using the method used in the GSM network, for example. When the mobile station finds a signalling channel meeting a predetermined selection criterion, it synchronizes to that channel and reads the signalling information on it. A cell $CEL_{i,j}$ or $CEL_{i,k}$ is selected. To simplify the description it is now assumed that the cell $CEL_{i,j}$ is selected. The cell selected belongs to one of the two layers of the network, and therefore step E3 contains by implication the selection of a network layer $CC_i$.

In practice the predetermined selection criterion is that the mobile station $SM_n$ should select the cell giving the highest power received signal, with the facility to correct this choice in accordance with the load of the base station $SB_{i,j}$ of the selected cell $CEL_{i,j}$. Different layer selection criteria can be used: for example, the user of the mobile station $SM_n$ could use a switch to select one of the layers; alternatively, when it is switched on, the mobile station $SM_n$ could select the layer or the cell that was selected when it was switched off, the relevant information being stored for this purpose in the mobile station.

After selecting the cell, the mobile station $SM_n$ stores data such as the access channel addresses and the access area number of the cell selected. The mobile station is registered in the layer of cells $CC_i$ and in this way signals its location to the infrastructures of the cellular network via the base station for the cell selected.

Figure 4:
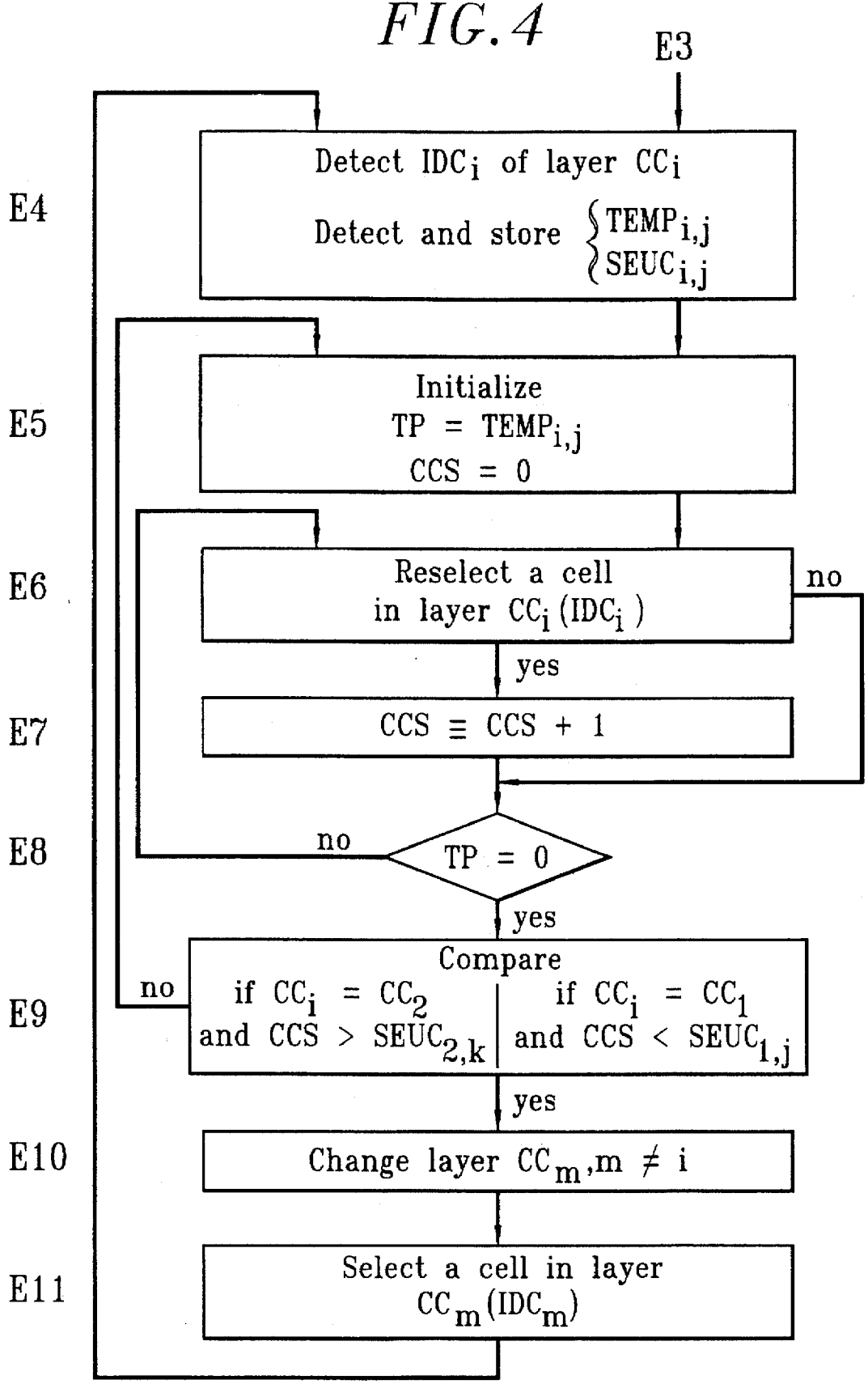
FIG. 4 shows a cell selection and reselection algorithm of the invention.

FIG. 4 shows an algorithm with eight steps E4 through E11. In step E4 the mobile station $SM_n$ detects the layer identifier $IDC_i$ of the layer containing the cell selected in step E3 or in step E11 (see below), the value of the time-delay $TEMP_{i,j}$ and the value of the threshold $SEUC_{i,j}$ corresponding to the cell previously selected. The mobile station stores the latter two values. The mobile station $SM_n$ includes a PROM in which the identifiers of the various layers in which the mobile station can detect cell identifiers are stored. In this way the mobile station "recognizes" the identifier detected by comparing it to the stored identifiers. In step E5 a programmable downcounter is triggered in the mobile station to count down predetermined clock periods representing a time-delay TP which is initialized to the stored time-delay value $TEMP_{i,j}$. Simultaneously with step E5, a programmable cell counter in the mobile station is zeroed so that its count CCS is incremented for each new cell selected in the next step E6.

Step E6 reselects another cell belonging only to the selected layer $CC_i$ on the basis of the selection criterion used in step E3. The mobile station examines only cells in which the signalling channels have an information field $CI_{i,j}$ containing the identifier $IDC_i$ of the previously selected layer $CC_i$.

In step E7 the cumulative count CCS of the number of cells reselected in the layer $CC_i$ in step E6 is incremented by one unit each time the mobile station $SM_n$ selects in step E6 a new cell different from the current cell selected during a previous cycle of steps E6 through E8.

Step E8 checks the time-delay TP. If it has not run out, the mobile station $SM_n$ reselects cells in the selected layer (step E6) and the count CCS accumulates units as previously (step E7). When the time-delay TP has run out (TP=0) the cumulative count of selected cells CCS is compared with the threshold $SEUC_{i,j}$ or $SEUC_{i,k}$ in step E9.

The comparison step E9 differs according to the layer.

For the layer of microcells $CC_2$, if the cumulative count CCS of cells reselected during the time-delay TP is greater than the threshold $SEUC_{2,k}$ associated with the layer of the cell selected before step E4, this means that the mobile station has selected too great a number of microcells, i.e. it has accelerated, and that it is preferable to change layer to select larger cells, in order to avoid too many intercell handovers during a call about to be set up.

Figure 5:
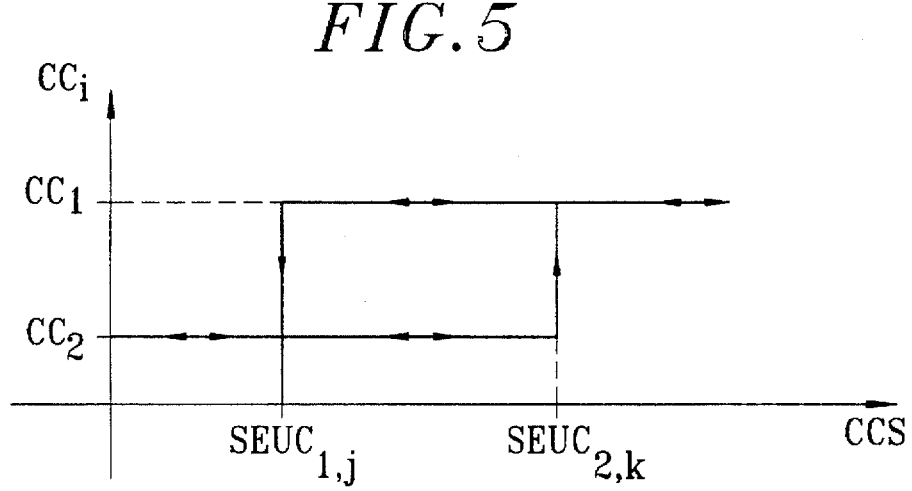
FIG. 5 is a diagram showing a change between two cell layers as a function of a cumulative count of cells selected in accordance with the invention.

On the other hand, for the layer of macrocells $CC_1$, if the cumulative count CCS of cells reselected during the time-delay TP is less than the threshold $SEUC_{1,j}$ associated with the layer of the cell selected before step E4, this means that the mobile station $SM_n$ has not moved far compared to the size of the macrocells. The layer of microcells is then sufficient for this slow-moving or virtually stationary mobile station which will require only a few intercell handovers (or none at all) during a call about to be set up. It is preferable to change layer to select small cells to release the layer of macrocells $CC_1$ for faster mobile stations. FIG. 5 shows the changes of layer as a function of the cumulative count CCS of cells selected at the end of each time-delay TP. The arrows pointing towards the right indicate an increase in the count CCS per unit of time and therefore "acceleration" of the mobile station $SM_n$. The arrows pointing to the left indicate a reduction in the count CCS per unit time and thus "deceleration" of the mobile station $SM_n$.

Figure 6:
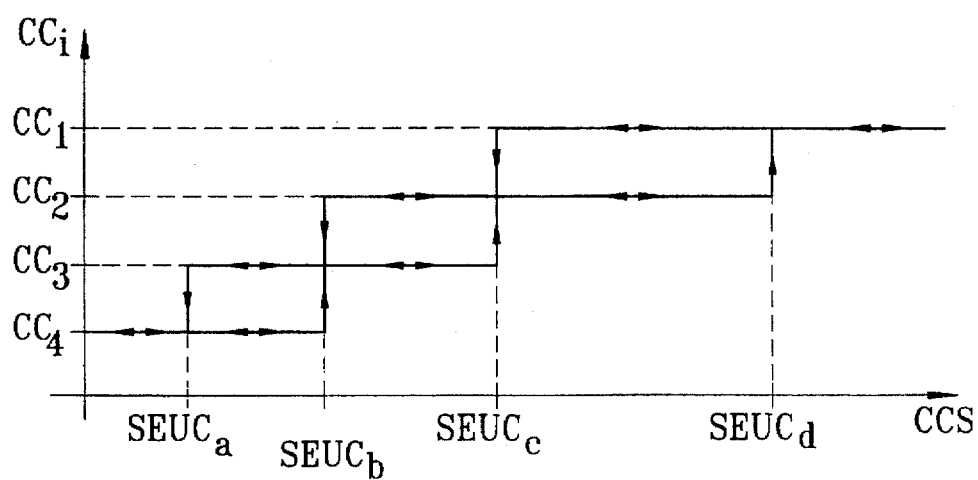
FIG. 6 is a diagram showing a change between cell layers as a function of a cumulative count of cells selected in accordance with the invention in the case of a network with four cell layers.

In the case of a network with at least three layers, the comparison step is identical to that described for the largest, respectively smallest cell layer. For an intermediate layer, the cumulative count CCS is compared to two thresholds corresponding to two layers between which the currently selected layer lies, one of the two layers having large cells covering each of the cells of the current layer and the other of the two layers having small cells covered by each of the cells of the current layer. The two thresholds define the limits of a range of variation of the cumulative count which, if crossed, imposes a change of layer. The information field sent by a base station of an intermediate layer contains both thresholds and is therefore longer than the information field as previously described. For example, FIG. 6 shows changes of layer as a function of the cumulative count CCS of cells selected at the end of each time-delay TP for a network having four layers $CC_1$ through $CC_4$ defined by thresholds $SEUC_a$ through $SEUC_d$ assuming that all the threshold values in the cells of the same layer are equal. The arrows in FIG. 6 have the same meaning as in FIG. 5. It is assumed that the condition $SEUC_a < SEUC_b < SEUC_c < SEUC_d$ is met so that changes of layer are effected from one layer to another layer which is an "adjacent" layer in terms of the size of the cells, for example from layer $CC_2$ to layer $CC_3$. This regular progress of change of layer is suitable for most multilayer networks. Nevertheless, it is possible, at least locally, to choose a different order for the threshold values and therefore for the changes of layer, for example from layer $CC_1$ to layer $CC_3$.

The time-delay values $TEMP_{i,j}$ and $TEMP_{i,k}$ and the threshold values $SEUC_{i,j}$ and $SEUC_{i,k}$ are a priori different from one layer to another, and also from one cell to another in the same layer, because not all cells in the same layer cover the same area. These values can equally well be defined for a given location area. Furthermore, it is possible to modify the above values dynamically in each base station.

If one of the above conditions is satisfied in step E9, a change of layer is effected in step E10. The mobile station $SM_n$ then uses the layer $CC_m$, where m is different from i, which becomes the new selected layer. The mobile station $SM_n$ then considers for use only cells in the layer $CC_m$, i.e. signalling channels in which the information field contains the layer identifier $IDC_m$.

Then, in step E11, the mobile station selects a cell in the new layer $CC_m$ most recently selected and is registered in this most recently selected layer, in a similar manner to the operations of step E3.

After step E11, the mobile station reverts to step E4 to memorize data from the information field of the cell selected in the most recently selected layer $CC_m$. The detection of the layer identified in step E4 is then optional, since the layer identifier has been chosen previously by the mobile station in step E10.

If, in step E9, comparing the cumulative count CCS with one or two thresholds does not indicate crossing of either threshold and a change of layer, then the algorithm returns to step E5 to zero the count CCS and to reinitialize the time-delay TP to the value $TEMP_{i,j}$. It then reselects cells in the same layer $CC_i$ for a subsequent time-delay TP.

As a general rule, since the cumulative count CCS for any cell included in the layer $CC_4$ containing the smallest cells is always greater than a second threshold equal to zero and the cumulative count CCS for any cell included in the layer $CC_1$ containing the largest cells is always below a first threshold equal to a high number, typically $2^3=8$, or even infinite, the count CCS is always compared to first and second predetermined thresholds depending on the size of the selected cell $CEL_{i,j}$, $CEL_{i,k}$. If the cumulative number CCS is above the first threshold in step E9, then the current layer $CC_i$ is changed in step E10 for a selected layer $CC_m$, if any, with cells covering each of the cells of the current layer. If the cumulative number CCS is below the second threshold in step E9, then the current layer $CC_i$ is changed in step E10 for a selected layer $CC_m$, if any, having cells covered by each of the cells of the current layer.

In the case of an incoming call to be set up by the base station associated with the selected cell or in the case of an outgoing call to be set up by the mobile station, cell selection and reselection is interrupted and the cell used for the call is the last cell selected by the mobile station $SM_n$. The station $SM_n$ does not carry out any intercell handover other than between cells of the most recently selected layer during the standby state. At the end of the call the mobile station returns to step E2 if it is not switched off. Consequently, the cell selection/reselection and layer change process of the invention is never executed during a call in progress and simultaneously with intercell handover. However, during a call, and as shown at the bottom of FIG. 3, the mobile station continues to store the information fields $CI_{i,j}$, $CI_{i,k}$ shown in FIG. 2 on each intercell handover. The information contained in the last information field is then used when the mobile station reverts to the standby state for the next cyclic cell selection/reselection procedure.

What we claim is:

1. A method of cell selection and reselection by a mobile station in a multilayer cellular mobile radio network in which each layer includes a plurality of cells and said cells comprise base stations respectively, in which method, when said mobile station is in a standby state and after selection of a cell as a selected cell by said mobile station, the following steps are executed:

identifying a layer containing said selected cell to thereby define an identified layer, reselecting cells included in said identified layer during a predetermined time-delay associated with said selected cell to thereby define reselected cells, cumulatively counting a number of said reselected cells which are reselected in said identified layer during said predetermined time-delay, comparing said number of said reselected cells with a first predetermined threshold associated with said selected cell and a second predetermined threshold associated with said selected cell and lower than said first predetermined threshold, repeating the reselecting, cumulative counting and comparing steps if said number of said reselected cells lies between said first predetermined threshold and second predetermined threshold, changing said identified layer to a first selected layer of said multilayer cellular mobile radio network having cells covering the cells of said identified layer if said number of said reselected cells is above said first predetermined threshold and to a second selected layer of said multilayer cellular mobile radio network having cells covered by the cells of said identified layer if said number of said reselected cells is below said second predetermined threshold, and selecting a cell included in one of said first selected layer and second selected layer as another selected cell, thereby repeating the previous steps from said layer identifying step.

2. The method claimed in claim 1, wherein said identification step includes detecting an identifier of said layer containing said selected cell, said identifier being sent periodically by one of the base stations of said multilayer cellular mobile radio network transmitting to said selected cell.

3. The method claimed in claim 2, wherein, in response to said identifier, said mobile station detects said predetermined time-delay that is sent by said one of the base stations of said multilayer cellular mobile radio network transmitting to said selected cell.

4. The method claimed in claim 2, wherein, in response to said identifier, said mobile station detects said first predetermined threshold and second predetermined threshold that are sent by said one of the base stations of said multilayer cellular mobile radio network transmitting to said selected cell.

5. The method claimed in claim 1, wherein said layer identifying step follows any breaking off of communication between said mobile station and said multilayer cellular mobile radio network.

6. The method claimed in claim 1, wherein setting up a call between said mobile station and said multilayer cellular mobile radio network interrupts a current step between said layer identifying step and said cell selecting step.

7. A method of cell selection and reselection by a mobile station in a multilayer cellular mobile radio network in which each layer includes a plurality of cells and said cells comprise base stations respectively, in which method, when said mobile station is in a standby state and after selection of a cell as a selected cell by said mobile station, the following steps are executed:

identifying a layer containing said selected cell in an identified layer, said layer identifying step following any breaking off of communication between said mobile station and said multilayer cellular mobile radio network, reselecting cells included in said identified layer during a predetermined time-delay associated with said selected cell in reselected cells, cumulatively counting a number of said reselected cells which are reselected in said identified layer during said predetermined time-delay, comparing said number of said reselected cells with a first predetermined threshold associated with said selected cell and a second predetermined threshold associated with said selected cell and lower than said first predetermined threshold, repeating the reselecting, cumulative counting and comparing steps if said number of said reselected cells lies between said first predetermined threshold and second predetermined threshold, changing said identified layer to a first selected layer of said multilayer cellular mobile radio network having cells covering the cells of said identified layer if said number of said reselected cells is above said first predetermined threshold and to a second selected layer of said multilayer cellular mobile radio network having cells covered by the cells of said identified layer if said number of said reselected cells is below said second predetermined threshold, and selecting a cell included in one of said first selected layer and second selected layer as another selected cell, thereby repeating the previous steps from said layer identifying step.

8. The method of claim 7, wherein said identification step includes detecting an identifier of said layer containing said selected cell, said identifier being sent periodically by one of the base stations of said multilayer cellular mobile radio network transmitting to said selected cell.

9. The method claimed in claim 8, wherein, in response to said identifier, said mobile station detects said predetermined time-delay that is sent by said one of the base stations of said multilayer cellular mobile radio network transmitting to said selected cell.

10. The method claimed in claim 8, wherein, in response to said identifier, said mobile station detects said first predetermined threshold and second predetermined threshold that are sent by said one of the base stations of said multilayer cellular mobile radio network transmitting to said selected cell.

11. A method of cell selection and reselection by a mobile station in a multilayer cellular mobile radio network in which each layer includes a plurality of cells and said cells comprise base stations respectively, in which method, when said mobile station is in a standby state and after selection of a cell as a selected cell by said mobile station, the following steps are executed:

identifying a layer containing said selected cell in an identified layer, reselecting cells included in said identified layer during a predetermined time-delay associated with said selected cell in reselected cells, cumulatively counting a number of said reselected cells which are reselected in said identified layer during said predetermined time-delay, comparing said number of said reselected cells with a first predetermined threshold associated with said selected cell and a second predetermined threshold associated with said selected cell and lower than said first predetermined threshold, repeating the reselecting, cumulative counting and comparing steps if said number of said reselected cells lies between said first predetermined threshold and second predetermined threshold, changing said identified layer to a first selected layer of said multilayer cellular mobile radio network having cells covering the cells of said identified layer if said number of said reselected cells is above said first predetermined threshold and to a second selected layer of said multilayer cellular mobile radio network having cells covered by the cells of said identified layer if said number of said reselected cells is below said second predetermined threshold, selecting a cell included in one of said first selected layer and second layer as another selected cell, thereby repeating the previous steps from said layer identifying step, and setting up a call between said mobile station and said multilayer cellular mobile radio network, the setting up step interrupting a current step between said layer identifying step and said cell selecting step.

12. The method of claim 11, wherein said identification step includes detecting an identifier of said layer containing said selected cell, said identifier being sent periodically by one of the base stations of said multilayer cellular mobile radio network transmitting to said selected cell.

13. The method claimed in claim 12, wherein, in response to said identifier, said mobile station detects said predetermined time-delay that is sent by said one of the base stations of said multilayer cellular mobile radio network transmitting to said selected cell.

14. The method claimed in claim 12, wherein, in response to said identifier, said mobile station detects said first predetermined threshold and second predetermined threshold that are sent by said one of the base stations of said multilayer cellular mobile radio network transmitting to said selected cell.

15. The method claimed in claim 12, wherein said layer identifying step follows any breaking off of communication between said mobile station and said multilayer cellular mobile radio network.

* * * * *